MAGNETIC WIRE MEMORY AND CORE ACCESS SWITCH ARRAY

Filed April 15, 1964 3 Sheets-Sheet 1

INVENTOR
J. C. Mc ALEXANDER, JR.
BY
William H. Kamstra
ATTORNEY

July 2, 1968 J. C. McALEXANDER, JR 3,391,396

MAGNETIC WIRE MEMORY AND CORE ACCESS SWITCH ARRAY

Filed April 15, 1964 3 Sheets-Sheet 2

United States Patent Office 3,391,396

Patented July 2, 1968

3,391,396

MAGNETIC WIRE MEMORY AND CORE ACCESS SWITCH ARRAY

Joseph C. McAlexander, Jr., Center Valley, Pa., assignor to Bell Telephone Laboratories, Incorporated, New York, N.Y., a corporation of New York Filed Apr. 15, 1964, Ser. No. 359,950
19 Claims. (Cl. 340—174)

This invention relates to magnetic memory circuits, and particularly to memory circuit constructions adapted for economical and rapid assembly techniques.

The problem of winding conventional apertured magnetic memory cores has long been a challenging one in the magnetic memory art and the art is replete with attempts to accomplish this winding mechanically and even automatically on a mass basis. When the winding is done manually in large memory arrays, for example, the expense of laboriously threading each core with a number of winding turns, if not prohibitive, at least accounts for too large a proportion of the total cost of the memory.

With the advent of magnetic wire memory elements in the form of a core tape helically wound about an electrical conductor as described in the patent of A. H. Bobeck, No. 3,083,353, issued Mar. 26, 1963, the core winding problem is presented in a form hitherto unencountered. Advantageously each such magnetic memory element comes with one of its windings as an integral part thereof. The electrical conductor about which the core tape is wound may serve either as an energizing conductor or as an output conductor in which potentials are induced by flux switchings in the wound tape. The wire memory elements must still, however, be coupled to at least another energizing conductor in order to achieve a useful memory circuit. The winding problem is accentuated when an array of wire memory elements is to be operated in conjunction with a conventional toroidal core access switch array. The selective switching of cores in the latter array generate drive currents which are applied to word organized address segments of a parallel arrangement of wire memory elements as is well known. (A memory arrangement in which just such an energizing operation is accomplished is described in the copending application of C. F. Ault et al., Ser. No. 311,424, filed Sept. 25, 1963, now Patent No. 3,295,111, for example.)

The drive currents are applied to the address segments of the core tapes via electrical conductors in the form of flat strips which encircle, and are inductively coupled to, an entire grouping of wire memory elements. An individual conductor is coupled at one side of the grouping to the associated toroidal core of the access core array. The columns of cores of a coordinate core array thus define the word rows of corresponding memory planes of a multiplane memory. The flat word row drive conductors, or solenoids, as they are termed, are manually wound about the parallel grouping of wire memory elements at the word row addresses and then threaded through the associated core. Overlapping ends of the solenoid are then soldered to complete the electrical circuit. Although this manual assembly is simple, it is also laborious and time consuming and adds significantly to the cost of the memory.

When the solenoid winding operation is attempted mechanically, the additional problem is encountered of maintaining the cores substantially at a 45° angle with the planes of the memory. This is necessary for the subsequent right angle threading of the access core switch. With the cores of the array each arranged at a 45° angle with the rows and columns, the rows and columns of cores may be simultaneously threaded by the two sets of coordinate conductors normally required for well known coincident current selection of the cores.

An object of the present invention is a magnetic wire element memory construction which lends itself to more economical and rapid assembly techniques than heretofore known.

Another object of this invention is a magnetic memory construction which is readily adapted for machine assembly techniques.

A further object of this invention is a new and novel method for assembling a magnetic wire memory circuit.

It is also an object of this invention to provide a new and novel magnetic wire memory construction.

The foregoing and other objects of this invention are realized in one specific illustrative embodiment thereof comprising a plurality of parallelly arranged magnetic wire memory elements. In accordance with one advantageous arrangement such as is described in the aforementioned copending application of C. F. Ault et al., for example, each wire memory element has associated therewith a return electrical conductor employed in the output circuitry of the ultimate memory of which the present invention may advantageously comprise a part. Since this invention concerns itself primarily with a basic construction applicable to a variety of magnetic wire memories, the external circuitry and its detail and the complete operation of a typical memory need not be presented here. Such an operation is well known to one skilled in the art.

The parallelly arranged wire memory elements may conveniently be embedded in a flexible nonmagnetic tape of Mylar, for example, in order to maintain their relative spacing during the assembly process being described. As is well known, each of the magnetic wire memory elements has one of its operative conductors already provided therewith in the electrical conductor about which the core tape is helically wound. The solenoids which will define the word rows on magnetic wire memory elements are formed by winding a second electrical conductor helically around the parallel grouping of memory elements. When the latter elements are encased in a plastic tape, this latter winding may advantageously be done about the tape itself and is continued for a length of the encasing tape as determined by the number of word rows to be defined on the memory elements. The second conductor is pulled against one edge of the tape and enough slack is left at the other edge to provide a succession of loops.

At this point the windings of the second conductor are arranged on each side of the encasing tape in registration with the predetermined rows of bit addresses of the wire memory elements. By arranging the conductor windings thus parallelly registered closely against the tape sides, magnetic coupling with the address segments of the memory elements is assured while at the same time the flexibility of the encasing tape is retained. The continuous solenoid thus realized is now coupled to individual toroidal cores which comprise the access switch to be associated with the finished memory. Since, as previously mentioned, this invention is directed only to a basic construction, only one plane assembly, and hence only one column of the cores of the coordinate array of a conventional access switch matrix will be here considered.

In a basic embodiment the cores of a column of the switch matrix are threaded by a conducting bus and are spaced thereon in accordance with the spacings of the word rows defined on the magnetic wire memory elements. The arrangement of the cores is such that each core appears on the conducting bus between adjacent loops of the continuous solenoid as the core-bus subassembly is moved adjacent the memory element subassembly. Each solenoid loop is now electrically connected with the ocnducting bus between adjacent cores in any convenient manner such as soldering or welding. The resulting basic memory construction may then be repeated by folding and refolding the flexible tape encasing the memory elements to achieve a three-dimensional, multi-plane memory array. At each plane the loops of the continuous solenoid are connected to an associated core-bus subassembly, with the cores, as a result, being arranged in a coordinate array. The cores are then threaded with coordinate energizing conductors in any convenient manner known in the art. A biasing conductor may also thread each of the cores if the resulting core array is to be operated as a biased core switch. Although the solenoid conductor determining the word rows of the memory is continuous, it is apparent that since only one core of the array is selected during interrogation, the energized solenoid loop is electrically isolated from all of the other word row loops.

With the foregoing organization of a memory construction and its method of assembly according to the principles of this invention in mind, it will be appreciated that a number of variations and modifications in this basic construction may be achieved. For example, the cores may be preassembled on a plurality of core sticks substantially of the character described, for example, in Patent No. 3,106,703 of L. Katzin, issued Oct. 8, 1963. In such a core stick, the cores are maintained on the stick by a continuous conductor which, after the memory has been assembled, also serves as an energizing conductor. When the core sticks are associated with the memory construction contemplated in the present invention, its continuous conductor corresponds to the aforemenioned conducting bus and is electrically connected to the loops of the continuous solenoid of a memory plane between adjacent cores. Other arrangements and embodiments of this invention will be considered in further detail as the description thereof develops.

One feature of this invention is thus a continously wound conductor about a parallel arrangement of magnetic wire memory elements, the loops of which conductor are arranged in registration on each side of the memory elements to realize a plurality of parallelly arranged drive solenoids. At one side of the group of memory elements, the solenoid loops are each electrically connected to a conducting bus between adjacent cores mounted on the bus. Advantageously the solenoid loops thus formed to be in inductive coupling with the wire memory elements are electrically isolated from each other since only one of the solenoids is energized by the coupled magnetic core during an interrogation of the memory of which this basic construction is adapted for use.

According to another feature of this invention, the solenoid loops formed in the manner described in the foregoing may advantageously be magnetically coupled to respective cores of an associated core array in a number of ways. The loops may be simply soldered or otherwise connected between cores on a conducting bus on which the cores are mounted. The cores themselves may have a continuous conductor threaded therethrough, which conductor also has loops holding the cores to a mounting stick The loops of the solenoid conductor and core conductor may then be electrically connected between adjacent cores.

The foregoing and other objects and features of this invention will be better understood from a consideration of the detailed description of illustrative embodiments and assembly methods thereof which follows when taken in conjunction with the accompanying drawing in which.

Figure 1:
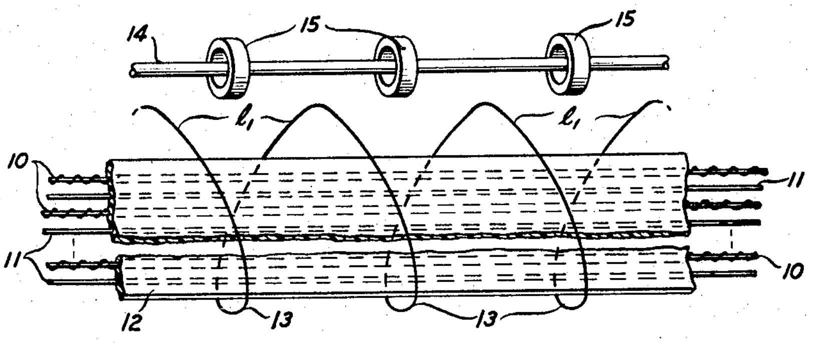
FIG. 1 depicts one step in the realization of a basic memory construction in accordance with the principles of this invention, only a portion of the partially assembled construction being shown.

In FIG. 1 is shown one embodiment of a magnetic memory construction according to this invention in a first step in its assembly. The memory construction comprises a plurality of magnetic wire memory elements 10 each having associated therewith a return conductor 11. The memory elements 10, although they may assume various forms, are contemplated herein for illustrative purposes as being of the character described in the patent of A. H. Bobeck cited hereinbefore and they, together with the return conductors 11, are conveniently encased in a flexible tape 12 of a magnetically and electrically insulating material such as, for example, that known commercially as Mylar. Since only a basic construction is presently being described, the tape 12 with its memory wires is shown in the drawing only as a fragment of a longer tape subassembly. The actual length of the memory elements and their encasing tapes and the width of the latter tapes will be determined by the capacity of the memory of which it is to be part and through which it is folded and refolded to make up the memory planes. Similarly, although only three memory elements 10 are shown as being encased in the tape 12, it is to be understood that these are representative only and, in the practice of this invention, the number of such elements would be determined by the number of binary bits to be stored in a word row, as is well known.

Around the tape 12 and its encased memory elements 10 is helically wound a continuous conductor 13 in a fashion to leave at one edge of the tape 12 a succession of substantially evenly spaced loops $l_1$. At the other edge of the tape 12, the conductor 13 may be drawn up closer to the tape. The other subassembly of the construction to be considered at this point comprises an electrically conducting bus 14 having a plurality of magnetic cores 15 mounted thereon along its length. The cores 15 are spaced along the bus 14 to correspond substantially with the spacings of the succession of loops $l_1$ of the conductor 13 but in a manner to alternate therewith. With the two subassemblies substantially in the relative positions shown in FIG. 1 a subsequent step in the assembly operation may be accomplished.

Figure 2:
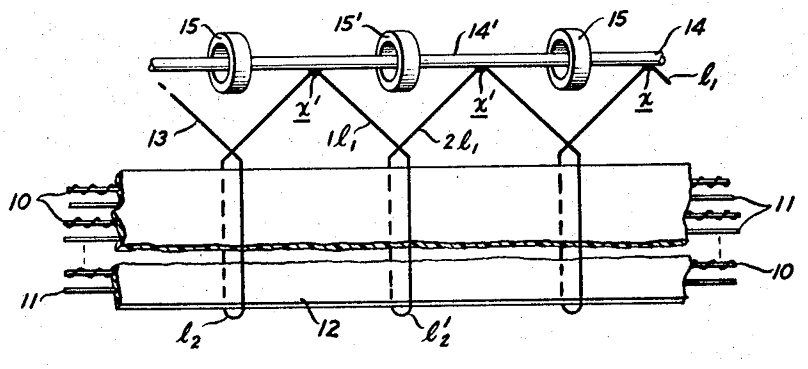
FIG. 2 depicts a subsequent step in the assembly of the basic memory construction of FIG. 1.

In FIG. 2 the basic memory construction of FIG. 1 is shown with the conductor loops $l_1$ electrically connected at the points $x$ on the conducting bus 14. These connections may be accomplished in any suitable manner known in the art such as soldering, welding, or the like. Prior to the joining of the solenoid conductor 13 with the bus 14, or, if it is more convenient, immediately thereafter, the opposite loops $l_2$ of the conductor 13 are arranged in substantial registration on each side of the tape 12 as shown in FIG. 2. Two parallel lengths are thus formed of the loops $l_2$ which are in inductive coupling with the magnetic wire memory elements 10 encased in the tape 12. The parallel arrangement of loops $l_2$ also define in the memory the binary word rows, each loop $b_2$ measuring off the binary bit addresses of a word row. Obviously the spacings between the word rows may be adjusted by controlling the pitch of the helical winding of the solenoid conductor 13 in the initial stage of the assembly to suit the particular magnetic and other considerations affecting the storage of information in the complete memory.

From the foregoing construction, it is apparent that a solenoid loop, connected on each side of a core 15 to the conducting bus 14, presents an electrically isolated circuit during the interrogation of a single word row as is conventionally the case in word organized magnetic memories. If, for example, in FIG. 2, the core 15' is selected to provide an interrogation drive, its switching will induce a potential across the portion 14' between the points $x'$ and $x'$ of the conducting bus 14 threaded therethrough. As a result, a current is generated in the circuit presented by the bus portion 14', solenoid loops $1l_1$ and $2l_1$, and the solenoid loop $l_2'$. In this interrogation operation the current in the circuit thus traced applies a switching magnetomotive force to the bit addresses defined on the memory elements 10 as is well known in the art. Obviously, all of the points $x$ on either side of a connection $x'$ are at the same potential and, accordingly, no current will flow in any of the solenoid loops on either side of the selected one being driven by the core 15'. The basic construction thus described advantageously make take a number of forms within the scope of this invention.

Figure 3:
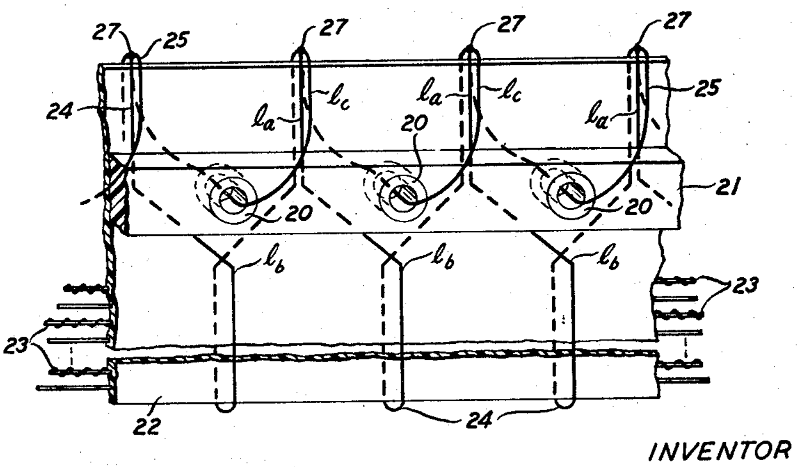
FIG. 3 depicts another specific embodiment according to the principles of this invention, the construction again being shown in fragmentary form.

FIG. 3 shows another embodiment of the construction according to the principles of this invention in which a plurality of cores 20 are preassembled in a "stick" 21. The stick 21 is advantageously fabricated of an nonmagnetic, electrically insulating material and has the cores 20 encased or fitted in apertures therein. It in turn may be bonded or otherwise affixed to one side of the Mylar tape 22 containing the magnetic memory elements 23 and other components of the memory such as were applicable, return conductors. The tape 22 has previously had helically wound therearound the continuous conductor 24 which ultimately is to constitute the plurality of solenoids coupled to the memory elements 23 in the fashion already described in connection with FIGS. 1 and 2. In variation from the construction shown in the latter figures, however, the conductor 24 is arranged in a plurality of alternately opposite, parallel loop sections $l_a$ and $l_b$. The latter loop section is parallelly arranged substantially in registration on either side of the tape 22 to insure inductive coupling with the memory elements 23. As is the case in the embodiment of FIGS. 1 and 2, the loop sections $l_b$, define the word rows of the memory and, within the word rows, the corresponding binary bit addresses. The memory elements 23 are encased within the tape 22 in an area near one edge leaving a blank area to be occupied by the bonded core stick 21. In the latter area, apertures are provided in the tape 22 to correspond with the apertures of the cores 20 maintained by the stick 21. The core stick 21 and tape 22 subassemblies may now be wired for the completion of individual solenoid sections. A second continuous conductor 25 is spirally wound around one edge of the tape 22 and threaded successively through the apertures of the cores 20, the pitch of the spiral being in accord with the pitch of the solenoid conductor 24 and the spacing of the cores 20. From this arrangement of the two conductors 24 and 25 at the core side of the tape 22 it is apparent that the loops $l_a$ will be in virtual contact with the loops $l_c$ formed in the conductor 25. An electrical connection 27 between each of the loops $l_a$ and $l_c$ can now readily be made in any suitable manner known in the art.

Figure 4:
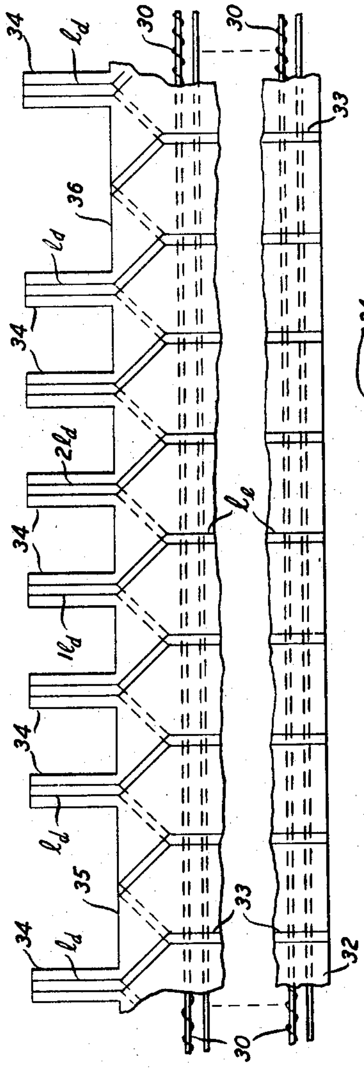
FIG. 4 depicts a portion of a memory element subassembly of the construction according to this invention demonstrating how the construction may be further simplified and adapted for more economical fabrication techniques.

The construction of FIG. 3 was again shown only in fragmentary form in order to depict the basic relationship of the subassemblies. FIG. 4 demonstrates one specific manner in which the memory element tape subassembly may be adapted to facilitate its association with the core subassembly. The memory element arrangement of FIG. 4 is also highly adaptable for automatic assembly techniques as will appear from a consideration of its construction. As in the embodiment of FIG. 1, the arrangement of FIG. 4 also begins with a length of flexible tape 32 having wire memory elements 30 and other operative circuit elements encased therein. Wound around the tape 32 in a helical fashion is a continuous conductor 33 which is shown in FIG. 4 already arranged to define, by parallelly registered loop sections, the word rows of the memory of which it is to become part. The manner in which the inductive coupling is achieved has already been considered in earlier embodiments and need not be repeated at this point. The conductor 33 is shown in the drawing as being a flattened strip to accord with its actual cross section in practice. The memory elements 30 are arranged substantially in an area near one edge of the tape 32 in order to allow space for a second set of loops $l_d$ in the solenoid conductor 33. After the conductor 33 has been drawn firmly around the tape 32, portions of the latter tape are removed between the loop $l_d$ with the result that these loops with the enclosing strips of the tape 32 now form a plurality of tabs 34 extending from one edge of the tape 32. Two other and more extended cut-outs 35 and 36 are also provided in the tape 32. The purpose of these will become apparent from the association of the subassembly of FIG. 4 with a core subassembly to be considered hereinafter. It is clear that a complete solenoid for a word row of the ultimate memory is achieved by tracing a circuit from the end of one of the tabs 34 formed by a loop $l_d$ to the next adjacent such tab 34 in either direction. Thus, for example, beginning at the end of the loop $1l_d$ and tracing downward along the solenoid in the foreground along the loop $l_e$ and then upward at the back of the tape 32, a single solenoid circuit is completed at the tab at the end of the loop $2l_d$ which circuit requires only a bridging means between the two tabs for coupling with a magnetic core.

Figure 5:
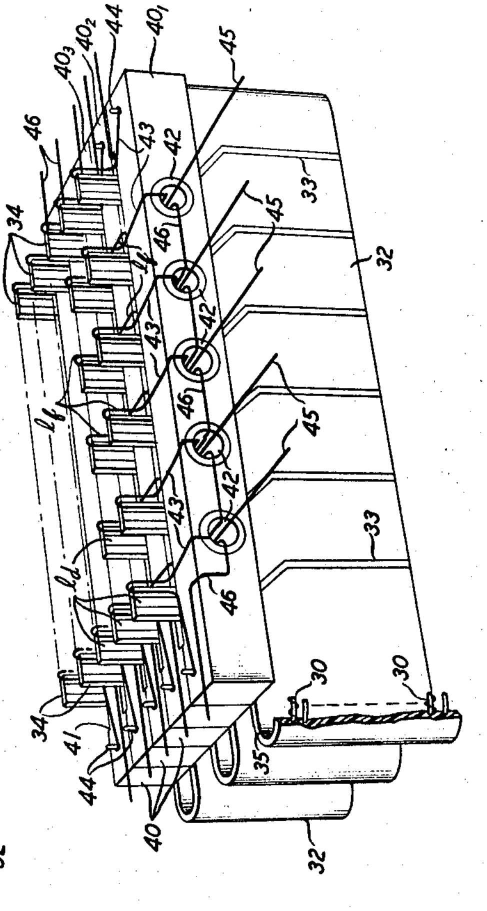
FIG. 5 is a simplified view of an assembled construction according to the principles of this invention employing the subassembly of FIG. 4.

This bridging means is provided when the tape subassembly of FIG. 4 is associated with an advantageous arrangement of core sticks shown in FIG. 5. The subassembly of FIG. 5 comprises a plurality of core sticks 40 having oppositely disposed offsets 41 therein. The offsets 41 provide slots when the sticks 40 are arranged in facing position, within which slots, as will be seen, the end tabs 34 of the loops $l_d$ of the tape subassembly shown in FIG. 4 may be inserted. For obvious reasons the first of the sticks, $40_1$, in the foreground of the figure requires only one such offset 41. Each of the sticks may conveniently be of an electrically insulating, nonmagnetic material and has a plurality of toridal magnetic cores 42 embedded therein having their radial planes parallel to the foreground and rear faces of the substantially rectangular cross sectioned sticks 40. The cores 42 are spaced along the sticks 40 substantially to correspond to the spacings of the loops $l_d$ of the conductor 33 of the subassembly of FIG. 4. Each of the core sticks 40 is prewired by a conductor 43 which is helically threaded through the core 42 apertures and around one side of the stick 40, that is, the top side as viewed in FIG. 5. The conductor 43, in which a suitable amount of slack has been left between adjacent cores, is now drawn up in a plurality of small U-shaped loops $l_f$ the planes of which may conveniently coincide with the plane of the offset 41 of the core stick 40. Suitable terminals 44 may be provided at the ends of the core sticks 40 to retain the ends of the conductor 43 and to make the appropriate electrical connections during subsequent wiring of the memory. At this point a core stick 40 has a succession of conductor loops $l_f$ equally spaced along its length, which spacings accord substantially with those of the cores 42 and those of the tabs 34 of the subassembly of FIG. 4.

The sticks 40 are arranged in facing positions with the core 42 apertures of each of the sticks 40 in alignment with the apertures of the cores of each of the other sticks. The sticks 40 may be retained as a single subassembly in any convenient manner known in the art such as bonding, bolting, and the like. With the core sticks 40 assembled as described, an access core matrix is presented which may now be further wired for its coordinate energizing conductors or as in the case being described, the step of assembling it with its memory element subassembly may next be accomplished.

Figure 6:
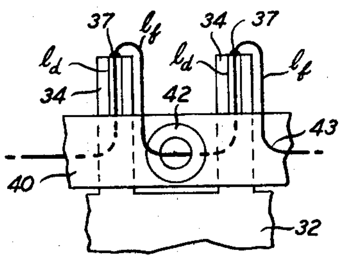
FIG. 6 depicts the manner in which the tabs and conductor loops of the construction of FIG. 5 are electrically connected, two tab-loop pairs being shown.

The memory element subassembly tape 32 of FIG. 4 is now taken and a first portion between the large notches 35 and 36 has its tabs 34 inserted in the slot formed by the facing offsets 41 of the first two sticks $40_1$ and $40_2$. The tabs 34 are arranged to alternate with the positions of the cores 42 and hence fall in a touching, or at least a close, proximity to the loops $l_f$ of the conductor 43 threading the cores 42 of the first core stick $40_1$. The end portion of the tape 32, throughout the length of which the cutout notch 35 may be extended, is folded forward as viewed in the drawing and there may be suitably terminated by, for example, a terminal block, not shown, to which the memory elements 30 and other conductors may be connected. At the right side of the assembly as viewed in FIG. 5, the notched portion 36 of the tape 32, not visible, is folded rearward and back upon itself so that the next series of tabs 34 may be inserted in the slot formed by the offsets 41 of the second and third core sticks $40_2$ and $40_3$ of the core matrix. The cut-out notch 36 is so dimensioned and positioned with respect to the dimensions of the core sticks 40 that the tabs 34 inserted in the second slot of the matrix will again fall between the positions of the cores 42 and in close proximity of the loops $l_f$ of the conductor 43 of the core stick $40_2$. This folding and refolding of the tape 32 is continued throughout the matrix of cores of FIG. 5 with the tabs 34 being inserted in the slots. At each slot the U-shaped loops $l_f$ falls into close relationship with the tabs 34 and, when the memory construction has been assembled as shown in FIG. 5, electrical connections 37 between each of the loops $l_d$ of the tabs 34 and its associated loop $l_f$ are made as shown in FIG. 6 where two such connections are depicted.

The access cores and the memory solenoids of a basic memory construction according to the principles of this invention have now been combined in a single assembly as described in the foergoing. A completely operative memory requires only the addition of energizing conductors for the cores 42 in order to perform the writing and reading operations. The coordinate core selection conductors 45 and 46, as shown in FIG. 5 may be threaded through the cores 42 in any suitable manner known in the art. The manner in which the cores 42 are prealigned in rows and colmns, for example, makes the threading of the conductors 45 simply a matter of passing them through the groups of respective apertures of the columns. The row conductors 46 may be wound on the cores 42 of each core stick 40 either prior to the assembly with the memory element tape 32 or after these subassemblies have been combined. The conductors 46 are shown in FIG. 5 as being threaded in alternating directions through the apertures of the cores 42 of each of the sticks 40. At each end of the sticks 40 and at the sides of the assembly of FIG. 5, terminals, now shown, similar to the terminals 44 may be provided in order to make suitable electrical connections with the external circuitry such as current pulse sources and the like, which are assumed to be connected to the energizing conductors in the actual operation of the memory construction.

The memory construction of this invention depicted in FIG. 5 may be employed in a number of memory applications as was previously mentioned. Thus, the construction may be employed in a permanent magnet memory arrangement of the character described in the copending application of C. F. Ault et al,, previously referred to, In this case coordinate patterns of permanent magnets are understood to be arranged in magnetic coupling with the information addresses defined on the memory elements embedded in the memory tape 32, In such an arrangement, a read-only memory results and no circuitry need be provided for the operation of the memory during a write phase. However, if the memory construction of this invention is to be employed to store binary information on an electrically variable basis, input circuitry, not shown in the drawing, will also be understood to be provided at one or the other ends of the memory elements 30 to achieve coincident current bit selection in the information rows.

Figure 7:
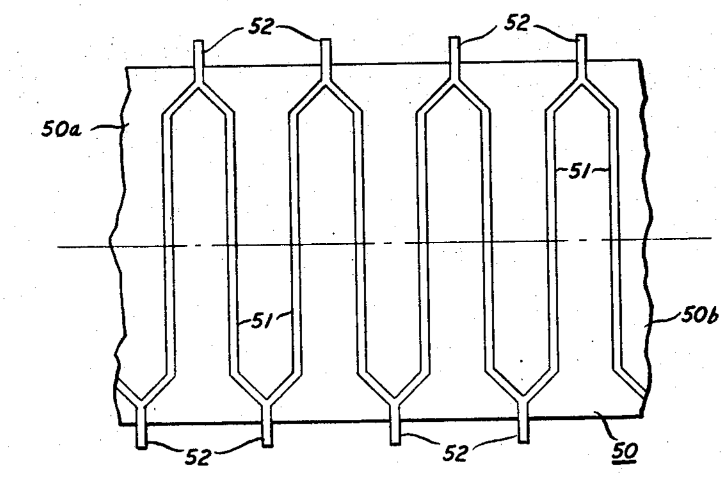
FIG. 7 shows a continuous conductor arranged in accordance with another embodiment of this invention preparatory to its association with magnetic wire memory elements, the structure being shown in fragment form.
Figure 8:
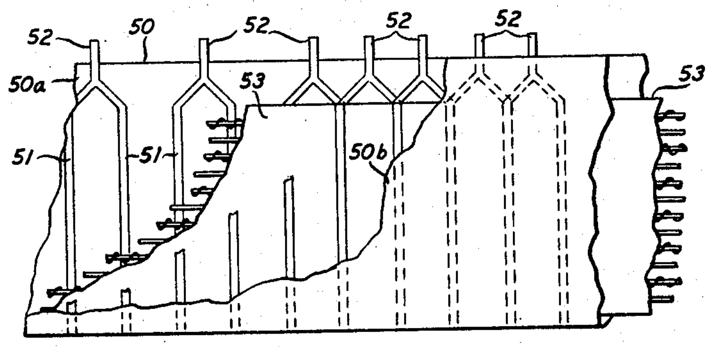
FIG. 8 shows the structure of FIG. 7 after its assembly with its memory elements, only a portion of a complete structure being shown for the sake of simplicity.

It will be appreciated by one skilled in the art that the principles of this invention may be implemented in specific constructions other than those described in the foregoing. Thus, for example, in FIGS. 7 and 8 are shown still another advantageous manner in which information row conductors may be brought into inductive coupling with a parallel arrangement of magnetic wire memory elements. An electrically nonconductive, nonmagnetic tape 50, which may again be of the material commercially known as Mylar, has a continuous conductor 51 mounted thereon in parallel, alternating directions across the longitudinal axis of the tape. The conductor 51 advantageously has a flat cross section and at each reversal point has formed thereon a tab 52 which may project beyond the edges of the tape 50. The tape 50, only a fragment of which is shown in FIG. 7, is folded on a center line, indicated by the dashed line, around the tape containing the wire memory elements, which tape is identical to the memory element tape contemplated in the embodiments of FIGS. 1 and 2. This folded construction is depicted in FIG. 8 as broken away to show the details more clearly. The two halves 50*a* and 50*b* of the tape 50 are folded around the aforementioned center line substantially upon themselves to enclose therewithin the memory tape 53. Only portions of each of the tapes are shown. As a result of the parallel alignments of the conductor 51 as it passes and repasses in both directions, the two halves of the passes of the conductor 51 are in precise registration and the two halves thus formed define in each row the information addresses on the memory elements mounted with the tape 53. When the two halves of the tape 50 are pressed into contact with the tape 53, inductive coupling of the conductor 51 with the wire memory elements is also insured. In the folded arrangement of the tape 50, the tabs 52, which alternated on the two edges of the tape in the unfolded state, now appear successively where the two edges of the tape 50 meet. The tabs 52 correspond functionally and structurally to the loops $l_1$, say, of the embodiment of FIG. 1 and will have electrically connected thereto in any suitable manner known in the art the associated core conductor previously described. Since this assembly phase is identical to core connection phases of the embodiments already considered it need not be repeated here and the cores are accordingly not shown in FIGS. 7 and 8.

A complete folded assembly of the embodiment of FIGS. 7 and 8 thus results in substantially the same subassembly as that depicted in FIG. 4 and it may in the same manner be folded and refolded longitudinally through the slots of a core matrix subassembly such as the one shown in FIG. 5. The tabs 52 are then connected to loops of a core row conductor in the manner previously described also in connection with the embodiment of FIG. 5.

It is to be understood that what have been described are considered to be only illustrative methods and embodiments of the principles of this invention and various and numerous other arrangements may be devised by one skilled in the art without departing from the spirit and scope of this invention as defined by the accompanying claims.

What is claimed is:

1. In a magnetic memory construction having a parallel arrangement of magnetic wire memory elements, a first continuous conductor wound around said memory elements in a manner to present a plurality of loops each having a first and a second portion in substantial registration, a plurality of magnetic cores each having an aperture therein, a second continuous conductor threading said aperture of each of said cores, and a plurality of electrical connections between said second conductor and said first conductor between each of said loops.

2. A memory construction for storing a plurality of binary information characters in rows and columns of magnetic storage addresses comprising a first continuous conductor encircling said storage addresses in a manner to present a plurality of loops each having a first and a second portion in substantial registration with said rows of storage addresses and in inductive coupling therewith, a plurality of magnetic cores each having an aperture therein, a second continuous conductor threading said aperture of each of said cores, and a plurality of electrical connections between said second conductor and said first conductor between each of said loops.

3. A memory construction in accordance with claim 2 wherein said storage addresses comprises segments of continuous wire memory elements parallelly maintained in a mounting means.

4. A memory construction in accordance with claim 2 wherein said plurality of magnetic cores are sequentially maintained in a mounting means and said second conductor is helically wound therearound and through said apertures of said cores.

5. A memory construction comprising a plurality of parallelly arranged magnetic wire memory elements, first conductor means encircling said memory elements in a plurality of loops, one side of each of said loops defining a sequence of information addresses on said memory elements, a sequence of magnetic cores each having an aperture therein, said sequence of cores being arranged substantially near the other side of each of said loops, second conductor means helically threading the apertures of said sequence of cores in a manner to form a series of loops therein, and means for electrically connecting respectively said last-mentioned series of loops and the other side of said loops of said first conductor means.

6. A memory construction as claimed in claim 5 in which said plurality of memory elements is mounted in an electrically nonconducting, nonmagnetic tape means and in which said cores are maintained in a retaining stick.

7. A memory construction comprising a plurality of parallelly arranged magnetic wire memory elements, a first continuous conductor means wound around said plurality of memory elements in a manner to form a first and a second plurality of opposite and alternating loops, said first loops being parallelly arranged to define a plurality of rows of information addresses on said plurality of memory elements, a sequence of magnetic cores each having an aperture therein, a second continuous conductor means threading each of said cores in the same direction and also forming a plurality of loops alternating respectively with said cores, and means for electrically connecting respectively said last-mentioned loops with said second loops of said first conductor means.

8. A memory construction comprising a flat, electrically insulating, nonmagnetic tape having a plurality of wire memory elements parallelly mounted therewith, a first conductor means continuously wound around said tape, said first conductor means presenting a first and a second plurality of alternating loops at each edge of said tape, the loops at one edge of said tape being arranged in parallel registration on the two sides of said tape to define a plurality of rows of information addresses on said memory elements, said tape being notched between each of the adjacent loops at the other edge of said tape to form a plurality of tabs, a plurality of rows of magnetic cores, each of said cores having an aperture therein, a second conductor means for each of said rows of cores, each of said second conductor means continuously threading each of the apertures of the cores of its row, said second conductor means also being formed in a plurality of loops alternating between said cores of said rows, said tape being arranged in alternating directions between said rows of cores with said tabs in close proximity respectively with said loops of said second conductor means in each of said rows, and means for electrically connecting respectively said last-mentioned loops and the loops of said first conductor means at the other edge of said tape.

9. A memory construction as claimed in claim 8 also comprising a first and a second plurality of coordinate energizing conductors threading respectively the apertures of said rows of cores in sequence and the corresponding apertures of said rows of cores.

10. A memory construction for storing a plurality of binary information characters in rows and columns of magnetic storage addresses comprising a continuous conductor encircling said storage addresses in a manner to present a plurality of loops each having a first and a second portion in substantial registration with said rows of addresses and in inductive coupling therewith, a plurality of energizing signals sources having a common output circuit means, and a plurality of electrical couplings between said common output circuit means and said continuous conductor between each of said loops.

11. An energizing circuit means for a first and a second information address row of a magnetic memory comprising a continuous first conductor passing in inductive coupling in one direction along the addresses of said first row from one end of said rows, returning to said one end and passing in inductive coupling in the same direction along the addresses of said second row from said one end of said rows, and returning to said one end, a first and a second magnetic core each having an aperture therein, a second conductor threading the apertures of both of said cores, and electrical connections between said first conductor and said second conductor on each side of each of said cores at said one end of said rows of cores.

12. An energizing circuit as claimed in claim 11 also comprising means for selectively switching the magnetic states of said first and second cores.

13. A magnetic memory construction comprising a sequence of wire memory elements, a first conductor wound at least twice around said sequence of memory elements beginning at a first of said elements in said sequence, a first and a second magnetic core, a second conductor inductively coupled to both of said cores, and electrical connections between said first conductor at the beginning and ending of each of said windings around said memory elements and said second conductor on each side of each of said cores.

14. A magnetic memory construction as claimed in claim 13 in which said cores each have an aperture therein and said second conductor is helically threaded through said apertures.

15. A magnetic memory construction comprising a plurality of magnetic wire memory elements, a continuous conductor wound a plurality of turns around said magnetic wire memory elements, a magnetic core, winding means coupled to said core, and electrical connections respectively between each end of said winding means and corresponding points on adjacent turns of said conductor.

16. A magnetic memory construction comprising a continuous first electrical conductor arranged in a plurality of back-and-forth segments, a plurality of magnetic wire memory elements arranged in inductive coupling with adjacent pairs of said segments, said pairs defining information address rows on said memory elements, a plurality of magnetic cores each having an aperture therein, a continuous second electrical conductor threading the apertures of said cores, and electrical connections between said first and second conductors at points between each of the segments of said pairs of segments on said first conductor and at points on each side of each of said cores on said second conductor.

17. A magnetic memory construction as claimed in claim 16 in which said plurality of magnetic wire memory elements are mounted in connection with a flat tape mounting means and in which said plurality of back-and-forth segments alternate on opposite sides of said tape mounting means.

18. An electrical circuit comprising a plurality of rows of electrically energizable devices, and common energizing circiuts for said rows comprising a continuous energizing conductor means arranged in a back-and-forth manner to pass each of said devices of said rows twice, a plurality of signal sources having a common output conductor means, electrical connections between said energizing conductor means and said common output conductor means at points between each of said rows on said energizing conductor means and at points on each side of said signal sources on said output conductor means, and means for selectively activating said signal sources.

19. An electrical circuit as claimed in claim 18 in which said electrically energizable devices each comprises a magnetic element capable of changing its magnetic state responsive to applied electrical signals.

References Cited

UNITED STATES PATENTS 3,341,830 9/1967 Conrath ------------ 340—174

BERNARD KONICK, *Primary Examiner.*

I. L. SRAGOW, *Examiner.*

H. D. VOLK, P. SPERBER, *Assistant Examiners.*